(12) United States Patent
Su (10) Patent No.: US 8,463,211 B2
(45) Date of Patent: Jun. 11, 2013

(54) RF SIGNAL RECEIVING APPARATUS

(75) Inventor: Tung-Ming Su, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 692 days.

(21) Appl. No.: 12/625,509

(22) Filed: Nov. 24, 2009

(65) Prior Publication Data

US 2011/0086604 A1 Apr. 14, 2011

(30) Foreign Application Priority Data

Oct. 9, 2009 (TW) .............................. 98134320 A (51) Int. Cl.
*H04B 1/10* (2006.01)
*H04B 1/26* (2006.01)
*H04B 1/16* (2006.01)

(52) U.S. Cl.
USPC ........... 455/130; 455/307; 455/324; 455/334; 375/343; 375/350

(58) Field of Classification Search
USPC ............. 455/179.1–180.3, 188.1–190.1, 209, 455/306–307, 311–315, 334, 337, 130, 213, 455/323–325, 339, 550.1; 375/343, 350
See application file for complete search history.

(56) References Cited

U.S. PATENT DOCUMENTS

| | | | |
|---|---|---|---|
| 7,196,574 B1 * | 3/2007 | Vishinsky | 327/557 |
| 7,266,361 B2 * | 9/2007 | Burdett | 455/334 |
| 7,505,746 B2 * | 3/2009 | Okanobu | 455/193.1 |
| 7,529,322 B2 * | 5/2009 | Mak et al. | 375/340 |
| 7,599,676 B2 * | 10/2009 | Maxim | 455/258 |
| 7,627,295 B2 * | 12/2009 | Takahiko et al. | 455/139 |
| 7,636,558 B2 * | 12/2009 | Olson | 455/226.1 |

(Continued)

FOREIGN PATENT DOCUMENTS

| | | |
|---|---|---|
| CN | 1471757 | 1/2004 |
| CN | 1630352 | 6/2005 |
| CN | 1706107 | 12/2005 |
| CN | 101193220 | 6/2008 |

OTHER PUBLICATIONS

"Office Action of Taiwan counterpart application" issued on Aug. 27, 2012, p. 1-p. 6.

(Continued)

*Primary Examiner* — Simon Nguyen
(74) *Attorney, Agent, or Firm* — Jianq Chyun IP Office (57) ABSTRACT

An RF signal receiving apparatus includes a first poly-phase filter, a second poly-phase filter, a first frequency-mixer module, a switch and a low-pass filter module. The first poly-phase filter receives an RF input signal and produces a filtered RF signal according to the received RF input signal. The first frequency-mixer module conducts frequency-mixing operation on a reduced-frequency signal and the filtered RF signal to produce a plurality of reduced-frequency RF signals. The switch receives and transmits the reduced-frequency RF input signal to a first channel or a second channel according to a selection signal. The second poly-phase filter receives the reduced-frequency RF signal transmitted by the second channel and filters the received signal. The low-pass filter module receives the filtered reduced-frequency RF signal or the reduced-frequency RF signal transmitted by the first channel to conduct low-pass filtering operation and produces a low-intermediate-frequency signal or a zero-intermediate-frequency signal.

11 Claims, 5 Drawing Sheets

U.S. PATENT DOCUMENTS

| | | | |
|---|---|---|---|
| 8,159,619 B2* | 4/2012 | Chen | 348/725 |
| 2004/0116096 A1* | 6/2004 | Shen | 455/323 |
| 2004/0125240 A1* | 7/2004 | Stikvoort et al. | 348/731 |
| 2006/0094390 A1 | 5/2006 | Pan et al. | |
| 2006/0189290 A1 | 8/2006 | Olson | |

OTHER PUBLICATIONS

"Office Action of China Counterpart Application", issued on Feb. 16, 2013, p1-p5, in which the listed references were cited.

* cited by examiner

RF SIGNAL RECEIVING APPARATUS

CROSS-REFERENCE TO RELATED APPLICATION

This application claims the priority benefit of Taiwan application serial no. 98134320, filed on Oct. 9, 2009. The entirety of the above-mentioned patent application is hereby incorporated by reference herein and made a part of specification.

BACKGROUND OF THE INVENTION

1. Field of the Invention

The present invention relates to a radio frequency (RF) signal receiving apparatus.

2. Description of Related Art

Among the contemporary technologies, the RF signal receiver applied in a system on chip (SOC) is usually categorized into two types: a so-called direct conversion RF signal receiver architecture and a so-called low-intermediate-frequency RF signal receiver architecture. The two types have different advantage and disadvantage from each other, so that a designer usually needs to choose an appropriate architecture to fit different applications or to meet different requirements.

Figure 1:
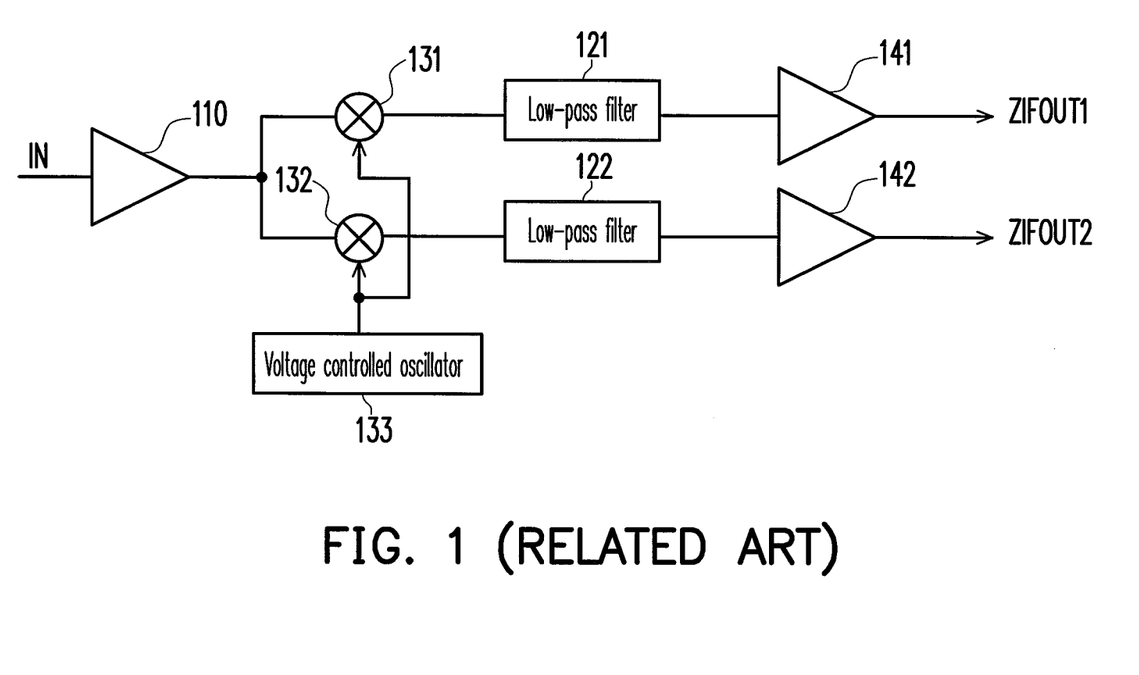
FIG. 1 is a diagram of a conventional RF signal receiver.

The following depiction is based on, for example, a direct conversion RF signal receiver architecture. FIG. 1 is a diagram of a conventional RF signal receiver. Referring to FIG. 1, an RF signal receiver includes a low-noise amplifier 110, two low-pass filters 121 and 122, two frequency-mixers 131 and 132, a voltage controlled oscillator 133 and two output buffers 141 and 142. The RF signal receiver receives an input signal IN through the low-noise amplifier 110, then the received signal is conducted by a signal processing with the frequency-mixers 131 and 132 and the voltage controlled oscillator 133. After that, the output buffers 141 and 142 output two so-called zero-intermediate-frequency output signals ZIFOUT1 and ZIFOUT2.

It should be noted that the RF signal receiver in FIG. 1 produces two zero-intermediate-frequency output signals ZIFOUT1 and ZIFOUT2 in direct conversion mode only, but is unable to produce output signals based on the low-intermediate-frequency RF signal receiver architecture. When a system requires two modes to receive an RF input signal, the above-mentioned design needs to build two independent RF signal receivers, which occupies larger circuit area on a chip and accordingly increases the cost of the chip.

SUMMARY OF THE INVENTION

Accordingly, the present invention is directed to an RF signal receiving apparatus with three available different RF signal reception modes.

The present invention provides an RF signal receiving apparatus, which includes a first poly-phase filter, a second poly-phase filter, a first frequency-mixer module, a switch and a low-pass filter module. The first poly-phase filter receives an RF input signal and produces an RF signal according to the received RF input signal. The first frequency-mixer module is coupled to the first poly-phase filter and conducts frequency-mixing operation on a reduced-frequency signal and the filtered RF signal so as to produce a reduced-frequency RF signal. The switch receives the reduced-frequency RF input signal and transmits the reduced-frequency RF signal to a first channel or a second channel according to a selection signal. The second poly-phase filter is coupled to the switch and receives the reduced-frequency RF signal transmitted by the second channel. The low-pass filter module is coupled to the second poly-phase filter and the switch or receives the reduced-frequency RF signal transmitted by the first channel to conduct low-pass filtering operation and further produces a low-intermediate-frequency signal or a zero-intermediate-frequency signal.

In an embodiment of the present invention, the above-mentioned RF signal receiving apparatus further includes an output buffer module. The output buffer module is coupled to the low-pass filter module for receiving and amplifying the low-intermediate-frequency signal or the zero-intermediate-frequency signal and for producing a low-intermediate-frequency output signal or a zero-intermediate-frequency output signal.

In an embodiment of the present invention, the above-mentioned RF signal receiving apparatus further includes a second frequency-mixer module coupled between the low-pass filter module and the output buffer module. When the low-pass filter module produces the zero-intermediate-frequency signal, the second frequency-mixer module enables a second local signal and the zero-intermediate-frequency signal getting frequency-mixing operation so as to produce an intermediate-frequency signal.

In an embodiment of the present invention, the above-mentioned RF signal receiving apparatus further includes a rising-frequency voltage controlled oscillator, and the rising-frequency voltage controlled oscillator is coupled to the second frequency-mixer module for producing a risen-frequency signal.

In an embodiment of the present invention, the above-mentioned output buffer module further receives and amplifies the intermediate-frequency signal so as to produce an intermediate-frequency output signal.

In an embodiment of the present invention, the above-mentioned output buffer module includes a plurality of amplifiers. The amplifiers are coupled to the low-pass filter module for receiving and amplifying the low-intermediate-frequency signal or the zero-intermediate-frequency signal and the intermediate-frequency signal.

In an embodiment of the present invention, each of the above-mentioned amplifiers is a programmable-gain amplifier (PGA) or variable gain amplifier (VGA).

In an embodiment of the present invention, the above-mentioned RF signal receiving apparatus further includes a reducing-frequency voltage controlled oscillator, which is coupled to the first frequency-mixer module for producing a reduced-frequency signal.

In an embodiment of the present invention, the above-mentioned low-pass filter module includes a first low-pass filter, a second low-pass filter and a switch. The first low-pass filter is coupled to the switch and the second poly-phase filter for receiving the output of the second poly-phase filter and conducting low-pass filtering operation on the received output or for conducting low-pass filtering operation on a portion of the reduced-frequency RF signal transmitted by the first channel. The second low-pass filter is coupled to the first low-pass filter and the switch for receiving another portion of the reduced-frequency RF signal transmitted by the first channel conducts low-pass filtering operation on the received another portion or conducts low-pass filtering operation on the output of the first low-pass filter. The switch is coupled between the first low-pass filter and the second low-pass filter for turning on or off the connection between the first low-pass filter and the second low-pass filter.

In an embodiment of the present invention, when the first low-pass filter receives the output of the second poly-phase filter while the second low-pass filter receives the output of the first low-pass filter and the first low-pass filter and the second low-pass filter respectively conduct low-pass filtering operation on the received signals, the low-pass filter module produces the low-intermediate-frequency signal.

In an embodiment of the present invention, when the first low-pass filter receives a portion of the reduced-frequency RF signal transmitted by the first channel while the second low-pass filter receives another portion of the reduced-frequency RF signal transmitted by the first channel and the first low-pass filter and the second low-pass filter respectively conduct low-pass filtering operation on the received signals, the low-pass filter module produces the zero-intermediate-frequency signal.

In an embodiment of the present invention, the above-mentioned first poly-phase filter is an RF poly-phase filter.

In an embodiment of the present invention, the above-mentioned second poly-phase filter is an IF poly-phase filter.

In an embodiment of the present invention, the above-mentioned RF signal receiving apparatus further includes a low-noise amplifier, which is coupled on a path where the first poly-phase filter receives the RF input signal.

Based on the depiction above, the present invention employs single circuit architecture to realize the direct conversion receiver, the low-intermediate-frequency receiver and the intermediate-frequency receiver, which effectively exploits the hardware in an RF signal receiving apparatus to promote the competition of the product.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 2:
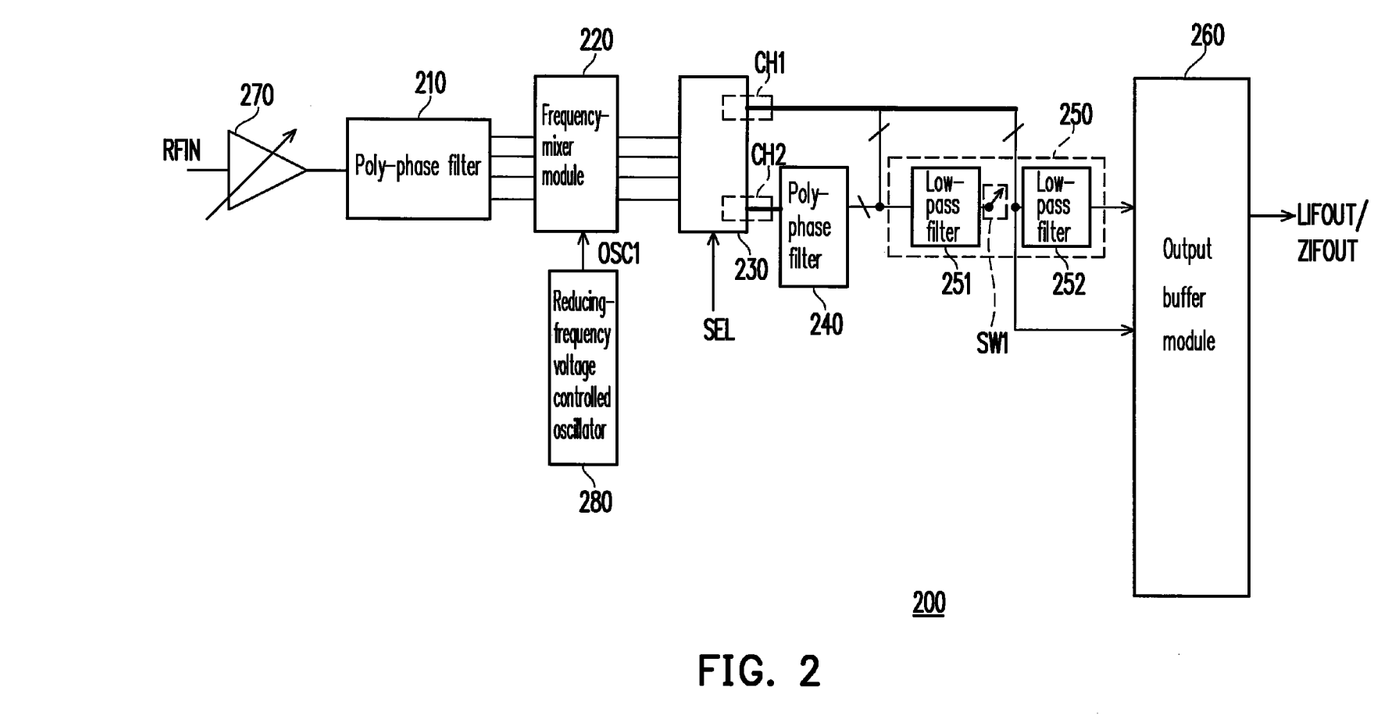
FIG. 2 is a diagram of an RF signal receiving apparatus 200 according to an embodiment of the present invention.

FIG. 2 is a diagram of an RF signal receiving apparatus 200 according to an embodiment of the present invention. Referring to FIG. 2, the RF signal receiving apparatus 200 includes two poly-phase filters 210 and 240, a frequency-mixer module 220, a switch 230, a low-pass filter module 250, an output buffer module 260, a low-noise amplifier 270 and a reducing-frequency voltage controlled oscillator 280. The low-noise amplifier 270 is coupled to the poly-phase filter 210 and receives an RF input signal RFIN for amplifying the RF input signal RFIN, followed by transmitting the amplified RF input signal RFIN to the poly-phase filter 210. The poly-phase filter 210 receives the RF input signal RFIN and thereby produces a pair of RF signals with a delay of 90° phase-angle between the two signals. The RF signals with a delay of 90° phase-angle between the two signals are transmitted to the frequency-mixer module 220 coupled to the poly-phase filter 210. The frequency-mixer module 220 further receives a reduced-frequency signal OSC1 and conducts frequency-mixing operation on the reduced-frequency signal OSC1 and the filtered RF signals so as to produce a pair of reduced-frequency RF signals with a delay of 90 phase-angle between the two signals.

It should be noted that the reduced-frequency signal OSC1 is produced by the reducing-frequency voltage controlled oscillator 280. To adjust the reduced-frequency signal OSC1, only the voltage received by the reducing-frequency voltage controlled oscillator 280 needs to be altered, which means the reduced-frequency signal OSC1 can be dynamically adjusted by using software or hardware.

The switch 230 is coupled to the frequency-mixer module 220 and receives the reduced-frequency RF signals produced by the frequency-mixer module 220. The switch 230 is controlled by a selection signal SEL. The switch 230 decides the reduced-frequency RF signal is transmitted to a first channel CH1 or a second channel CH2 by selection according to the selection signal SEL. The selection signal SEL is determined according to the modes for the RF signal receiving apparatus 200 to receive and process the RF signal. If the RF signal receiving apparatus 200 is set for producing a zero-intermediate-frequency output signal or an intermediate-frequency output signal, the selection signal SEL is set that the reduced-frequency RF signal is transmitted to the first channel CH1 through controlling the switch 230. On the other hand, if the RF signal receiving apparatus 200 is set for producing a low-intermediate-frequency output signal, the selection signal SEL is set that the reduced-frequency RF signal is transmitted to the first channel CH2 through controlling the switch 230.

The poly-phase filter 240 is coupled to the second channel CH2 of the switch 230 for receiving the reduced-frequency RF signal transmitted by the second channel CH2 and conducting low-pass filtering operation on the received signal. In other words, the poly-phase filter 240 works only when the switch 230 transmits the reduced-frequency RF signals to the second channel CH2 according to the selection signal SEL.

The low-pass filter module 250 is coupled to the first channel CH1 of the switch 230 and the poly-phase filter 240. The low-pass filter module 250 receives the output of the poly-phase filter 240 or the reduced-frequency RF signal transmitted by the first channel CH1 and conducts filtering operation on the received signal. The low-pass filter module 250 includes two low-pass filters in series connection 251 and 252 therein. When the low-pass filter module 250 receives the output of the poly-phase filter 240, the switch SW1 is on, and the low-pass filters 251 and 252 sequentially conduct filtering operation on the output of the poly-phase filter 240 and then the low-pass filter 252 outputs the low-intermediate-frequency signal. When the low-pass filter module 250 receives the reduced-frequency RF signal transmitted by the first channel CH1, the switch SW1 is off (disconnected), the low-pass filter 251 receives a portion of the reduced-frequency RF signal transmitted by the first channel CH1 and conducts filtering operation on the received signal, while the low-pass filter 252 receives another portion of the reduced-frequency RF signal transmitted by the first channel CH1 and conducts filtering operation on the received signal. Then, the low-pass filters 251 and 252 respectively output a zero-intermediate-frequency signal.

The output buffer module 260 is coupled to the low-pass filter module 250. The output buffer module 260 receives the low-intermediate-frequency signal or the zero-intermediate-frequency signal produced by the above-mentioned low-pass filter module 250 and amplifies the low-intermediate-frequency signal or the zero-intermediate-frequency signal, so as to produce a low-intermediate-frequency output signal LIFOUT or a zero-intermediate-frequency output signal ZIFOUT.

It should be noted that the poly-phase filter 210 in the embodiment is an RF poly-phase filter, and the poly-phase filter 240 is an IF poly-phase filter.

The operation detail of the RF signal receiving apparatus 200 in the embodiment of the present invention is further explained as follows, so that anyone skilled in the art can easily understand and implement the present invention.

Figure 3A:
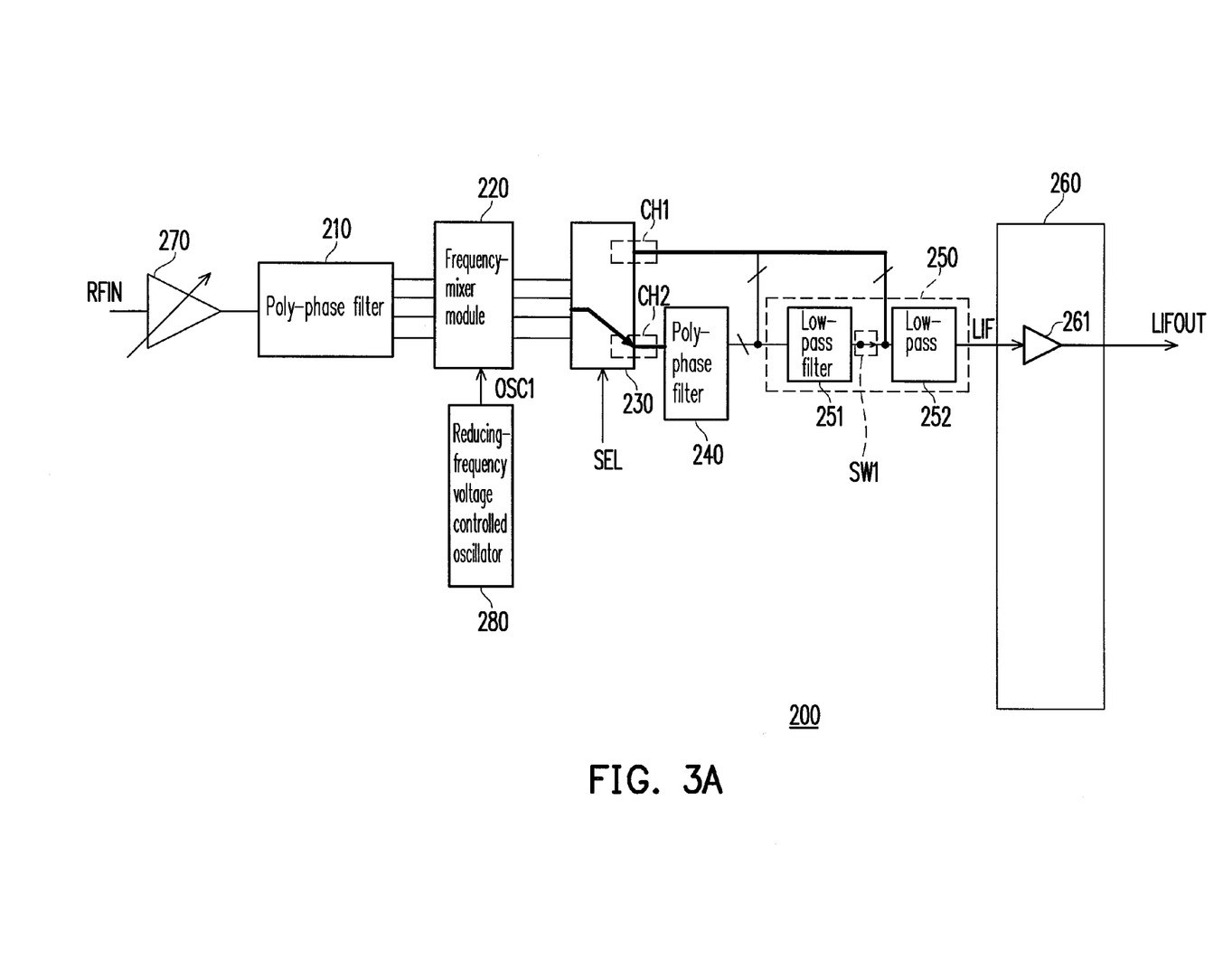
FIGS. 3A and 3B are two diagrams showing different operation modes of the RF signal receiving apparatus 200 in the embodiment of the present invention.
Figure 3B:
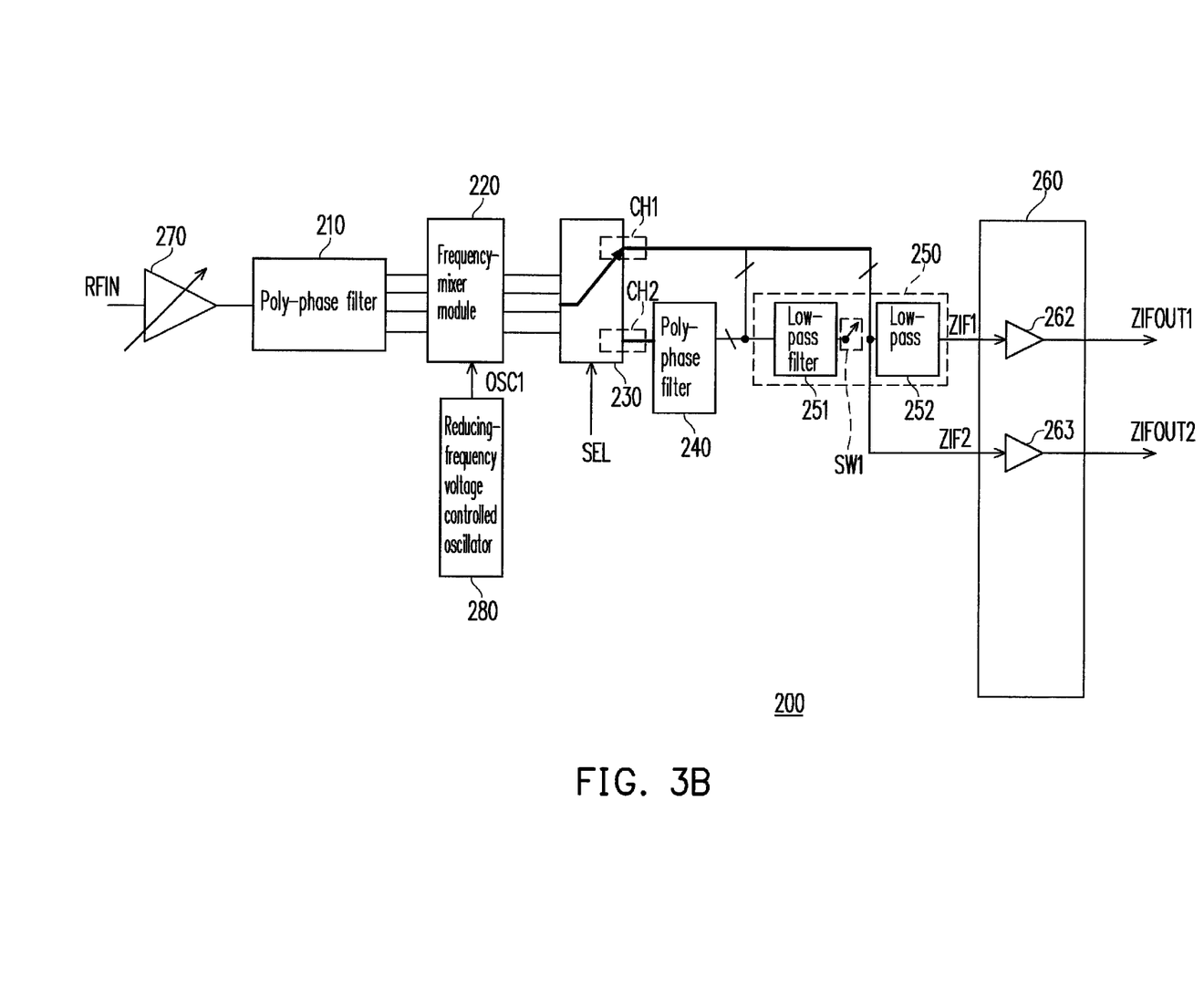

FIGS. 3A and 3B are two diagrams showing different operation modes of the RF signal receiving apparatus 200 in the embodiment of the present invention. Referring to FIG. 3A, the RF signal receiving apparatus 200 herein is set to receive the RF input signal RFIN with outputting the low-intermediate-frequency output signal. The RF input signal RFIN is received and amplified by the low-noise amplifier 270 and then transmitted to the poly-phase filter 210. The frequency-mixer module 220 receives the output of the poly-phase filter 210, produces the reduced-frequency RF signal and transmits the reduced-frequency RF signal to the switch 230, wherein the switch 230 transmits the reduced-frequency RF signal to the poly-phase filter 240 through the second channel CH2 according to the selection signal SEL.

The low-pass filter module 250 receives the output of the poly-phase filter 240 and uses the low-pass filters 251 and 252 to sequentially conduct filtering operation on the output of the poly-phase filter 240 (at the time, the switch SW1 is on) so as to produce a low-intermediate-frequency signal LIF. The amplifier 261 in the output buffer module 260 receives and amplifies the low-intermediate-frequency signal LIF and then produces a low-intermediate-frequency output signal LIFOUT.

Referring to FIG. 3B, the RF signal receiving apparatus 200 herein is set to receive the RF input signal RFIN with outputting the zero-intermediate-frequency output signal. The RF input signal RFIN is received and amplified by the low-noise amplifier 270 and then transmitted to the poly-phase filter 210. The frequency-mixer module 220 receives the output of the poly-phase filter 210, produces the reduced-frequency RF signal and transmits the reduced-frequency RF signal to the switch 230, wherein the switch 230 transmits the reduced-frequency RF signal to the poly-phase filter 250 through the first channel CH1 according to the selection signal SEL. It can be seen the reduced-frequency RF signal is divided into two portions, which are respectively input to the low-pass filters 251 and 252. The low-pass filters 251 and 252 respectively conduct filtering operation on the received portions of the reduced-frequency RF signal (at the time, the switch SW1 is off) so as to produce two zero-intermediate-frequency signals ZIF1 and ZIF2.

The output buffer module 260 includes two amplifiers 262 and 263. The amplifiers 262 and 263 respectively receive and amplify the zero-intermediate-frequency signals ZIF1 and ZIF2 so as to produce two zero-intermediate-frequency output signals ZIFOUT1 and ZIFOUT2.

It should be noted that according to FIGS. 3A and 3B and the above-mentioned depiction, the RF signal receiving apparatus 200 does not produce the low-intermediate-frequency signal LIF and the zero-intermediate-frequency signals ZIF1 and ZIF2 simultaneously, which suggests the amplifier 262 of FIG. 3B and the amplifier 261 of FIG. 3A can be realized by single amplifier.

In addition, in the embodiment, the amplifiers 261-263 can be implemented by a PGA or VGA.

Figure 4:
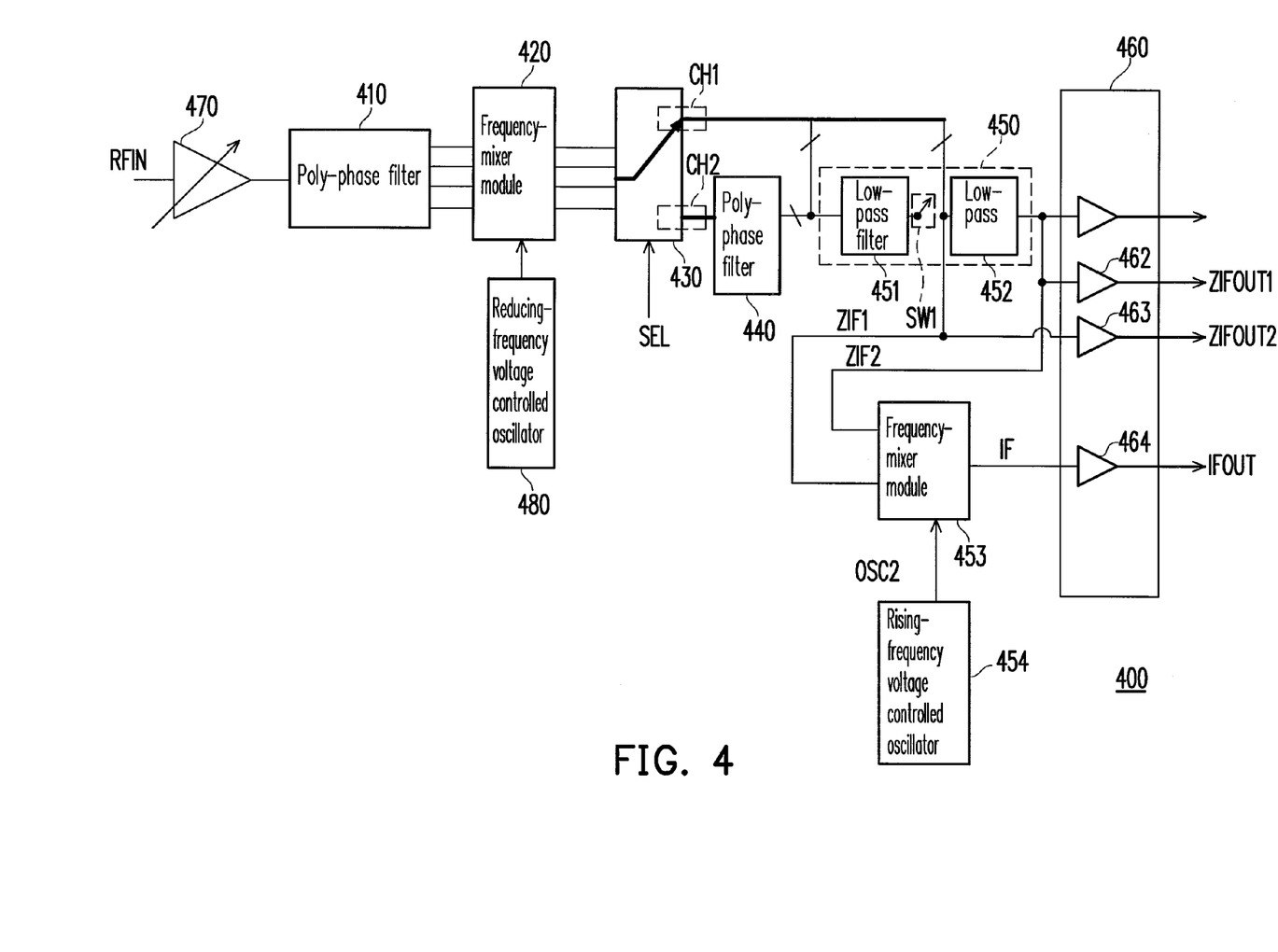
FIG. 4 is a diagram of an RF signal receiving apparatus 400 according to another embodiment of the present invention.

FIG. 4 is a diagram of an RF signal receiving apparatus 400 according to another embodiment of the present invention. Referring to FIG. 4, the RF signal receiving apparatus 400 includes two poly-phase filters 410 and 440, a frequency-mixer module 420, a switch 430, a low-pass filter module 450, an output buffer module 460, a low-noise amplifier 470 and a reducing-frequency voltage controlled oscillator 480. Different from the previous embodiment, the RF signal receiving apparatus 400 herein further includes a frequency-mixer module 453 and a rising-frequency voltage controlled oscillator 454, wherein the rising-frequency voltage controlled oscillator 454 is connected to the amplifier 464 in the output buffer module 460.

The frequency-mixer module 453 herein is coupled between the low-pass filter module 450 and the output buffer module 460. The frequency-mixer module 453 conducts frequency-mixing operation on the zero-intermediate-frequency signals ZIF1 and ZIF2 produced by the low-pass filter module 450 according to the received risen-frequency signal OSC2 and then produces the intermediate-frequency signal IF. In other words, the additional frequency-mixer module 453 in the embodiment is required when the RF signal receiving apparatus 400 is set to produce the intermediate-frequency output signal IFOUT, and at the time, the switch 430, according to the selection signal SEL, makes the output of the frequency-mixer module 420 transmitted to the low-pass filter module 450 via the first channel and then respectively transmitted to the low-pass filters 451 and 452 (at the time, the switch is disconnected).

The risen-frequency signal OSC2 is produced by the rising-frequency voltage controlled oscillator 454. Similarly to the reducing-frequency voltage controlled oscillator in the previous embodiment, the risen-frequency signal OSC2 can be adjusted by controlling the voltage received by the rising-frequency voltage controlled oscillator 454, and the adjustment can be realized by using hardware or software.

The amplifier 464 is built in the output buffer module 460 for receiving and amplifying the intermediate-frequency signal IF so as to produce the intermediate-frequency output signal IFOUT.

Besides, as the amplifier 464 produces the intermediate-frequency output signal IFOUT, the amplifiers 462 and 463 also at the same time receive the zero-intermediate-frequency signals ZIF1 and ZIF2. Therefore, the amplifiers 462 and 463 further at the same time produce the zero-intermediate-frequency output signals ZIFOUT1 and ZIFOUT2.

In summary, the present invention provides an RF signal receiving apparatus, which is able to output a low-intermediate-frequency signal or a zero-intermediate-frequency signal, even an intermediate-frequency signal. In this way, only a set of circuits is required to meet different demands, which effectively saves the circuit area on a chip and the product cost.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A radio frequency signal receiving apparatus, comprising:
   a first poly-phase filter, receiving a radio frequency input signal and thereby producing a plurality of filtered radio frequency signals;
   a first frequency-mixer module, coupled to the first poly-phase filter for conducting frequency-mixing operation on the filtered radio frequency signals according to a reduced-frequency signal so as to produce a plurality of reduced-frequency radio frequency signals;

a first switch, receiving the reduced-frequency radio frequency signal and transmits the reduced-frequency radio frequency signal to a first channel or a second channel according to a selection signal;

a second poly-phase filter, coupled to the first switch and receiving the reduced-frequency radio frequency signal transmitted by the second channel so as to conduct filtering operation;

a low-pass filter module, coupled to the second poly-phase filter and the first switch and receiving the reduced-frequency radio frequency signal transmitted by the first channel to conduct low-pass filtering operation and further produce a low-intermediate-frequency signal or a zero-intermediate-frequency signal, the low-pass filter module comprises:

a first low-pass filter, coupled to the first switch and the second poly-phase filter for receiving the output of the second poly-phase filter and conducting low-pass filtering operation on the received output or for conducting low-pass filtering operation on a portion of the reduced-frequency radio frequency signal transmitted by the first channel;

a second low-pass filter, coupled to the first low-pass filter and the first switch for receiving another portion of the reduced-frequency radio frequency signal transmitted by the first channel and conducting low-pass filtering operation on the received another portion or for conducting low-pass filtering operation on the output of the first low-pass filter; and a second switch, coupled between the first low-pass filter and the second low-pass filter for turning on or off the connection between the first low-pass filter and the second low-pass filter, wherein, when the first low-pass filter receives the output of the second poly-phase filter while the second low-pass filter receives the output of the first low-pass filter and the first low-pass filter and the second low-pass filter respectively conduct low-pass filtering operation on the received signals, the low-pass filter module produces the low-intermediate-frequency signal; and a reducing-frequency voltage controlled oscillator, coupled to the first frequency-mixer module for producing the reduced-frequency signal.

2. The radio frequency signal receiving apparatus as claimed in claim 1, further comprising:

an output buffer module, coupled to the low-pass filter module for receiving and amplifying the low-intermediate-frequency signal or the zero-intermediate-frequency signal and for producing a low-intermediate-frequency output signal or a zero-intermediate-frequency output signal.

3. The radio frequency signal receiving apparatus as claimed in claim 2, further comprising:

a second frequency-mixer module coupled between the low-pass filter module and the output buffer module, wherein when the low-pass filter module produces the zero-intermediate-frequency signal, the second frequency-mixer module conducts frequency-mixing operation on a risen-frequency signal and the zero-intermediate-frequency signal so as to produce an intermediate-frequency signal.

4. The radio frequency signal receiving apparatus as claimed in claim 3, further comprising:

a rising-frequency voltage controlled oscillator, coupled to the second frequency-mixer module for producing the risen-frequency signal.

5. The radio frequency signal receiving apparatus as claimed in claim 3, wherein the output buffer module further receives and amplifies the intermediate-frequency signal so as to produce an intermediate-frequency output signal.

6. The radio frequency signal receiving apparatus as claimed in claim 5, wherein the output buffer module comprises:

a plurality of amplifiers, coupled to the low-pass filter module for receiving and amplifying the low-intermediate-frequency signal or the zero-intermediate-frequency signal and the intermediate-frequency signal.

7. The radio frequency signal receiving apparatus as claimed in claim 6, wherein each of the amplifiers is a programmable-gain amplifier.

8. The radio frequency signal receiving apparatus as claimed in claim 1, wherein the first poly-phase filter is an radio frequency radio frequency poly-phase filter.

9. The radio frequency signal receiving apparatus as claimed in claim 1, wherein the second poly-phase filter is an intermediate-frequency poly-phase filter.

10. The radio frequency signal receiving apparatus as claimed in claim 1, further comprising:

a low-noise amplifier, coupled on a path where the first poly-phase filter receives the radio frequency input signal.

11. A radio frequency signal receiving apparatus, comprising:

a first poly-phase filter, receiving a radio frequency input signal and thereby producing a plurality of filtered radio frequency signals;

a first frequency-mixer module, coupled to the first poly-phase filter for conducting frequency-mixing operation on the filtered radio frequency signals according to a reduced-frequency signal so as to produce a plurality of reduced-frequency radio frequency signals;

a first switch, receiving the reduced-frequency radio frequency signal and transmits the reduced-frequency radio frequency signal to a first channel or a second channel according to a selection signal;

a second poly-phase filter, coupled to the first switch and receiving the reduced-frequency radio frequency signal transmitted by the second channel so as to conduct filtering operation;

a low-pass filter module, coupled to the second poly-phase filter and the first switch and receiving the reduced-frequency radio frequency signal transmitted by the first channel to conduct low-pass filtering operation and further produce a low-intermediate-frequency signal or a zero-intermediate-frequency signal, the low-pass filter module comprises:

a first low-pass filter, coupled to the first switch and the second poly-phase filter for receiving the output of the second poly-phase filter and conducting low-pass filtering operation on the received output or for conducting low-pass filtering operation on a portion of the reduced-frequency radio frequency signal transmitted by the first channel;

a second low-pass filter, coupled to the first low-pass filter and the first switch for receiving another portion of the reduced-frequency radio frequency signal transmitted by the first channel and conducting low-pass filtering operation on the received another portion or for conducting low-pass filtering operation on the output of the first low-pass filter; and a second switch, coupled between the first low-pass filter and the second low-pass filter for turning on or off the connection between the first low-pass filter and the second low-pass filter, wherein when the first low-pass filter receives a portion of the reduced-frequency radio frequency signal transmitted by the first channel while the second low-pass filter receives another portion of the reduced-frequency radio frequency signal transmitted by the first channel and the first low-pass filter and the second low-pass filter respectively conduct low-pass filtering operation on the received signals, the low-pass filter module produces the zero-intermediate-frequency signal; and a reducing-frequency voltage controlled oscillator, coupled to the first frequency-mixer module for producing the reduced-frequency signal.

\* \* \* \* \*